Fig. I.

Jan. 22, 1952          H. D. ELSE          2,583,140
MECHANICAL APPARATUS

Filed Nov. 4, 1949          4 Sheets-Sheet 2

WITNESSES:

INVENTOR
Harry D. Else.
BY
Paul E. Friedemann
ATTORNEY

Jan. 22, 1952     H. D. ELSE     2,583,140
MECHANICAL APPARATUS

Filed Nov. 4, 1949     4 Sheets—Sheet 4

WITNESSES:

INVENTOR
Harry D. Else.
BY
ATTORNEY

Patented Jan. 22, 1952

2,583,140

UNITED STATES PATENT OFFICE 2,583,140

MECHANICAL APPARATUS

Harry D. Else, Lima, Ohio, assignor to Westinghouse Electric Corporation, East Pittsburgh, Pa., a corporation of Pennsylvania Application November 4, 1949, Serial No. 125,558

11 Claims. (Cl. 74—801)

This invention relates generally to power transmission devices and, more particularly, to a motor-operated gear reduction drive which is useful, for instance, in connection with hoists.

The embodiment of this invention illustrated in the drawings is particularly adapted as the power unit in cargo hoists employed in aircraft. In such installations, it is customary to mount the power unit in the upper portion of the fuselage in a supporting structure secured to the bulkheads of the fuselage. The output of the power unit is mechanically connected by suitable means to a cargo hoist and is utilized to drive the winch on such a hoist. The use of such an arrangement in aircraft requires that the unit be small and compact because of the space and weight limitations attending such an application. Additionally, it is highly essential that a unit of this type be made explosion-proof inasmuch as gas fumes have a tendency to accumulate in the pocket formed in the upper portion of the fuselage. Such gas fumes may be readily ignited by sparks created at the brushes of an electric motor or by heat generated in bearings, by winding failure, by the rotor rubbing on the stator, or by any one of a multiplicity of the moving elements of the system. Accordingly, it is additionally essential that suitable means be provided on such a power unit to prevent ignition of the mentioned gas fumes.

A principal object of this invention is to provide a power drive unit of the character referred to which is small and compactly arranged and which additionally is light in weight for the power which is developed.

Another object of this invention is to provide a unit of the character referred to in which means are provided for quenching a flame which may be started internally of the equipment for any one of a number of reasons.

More specifically, it is an object of this invention to provide a motor-operated gear reduction unit which utilizes a high-speed motor and provides a high gear reduction between the motor and the output shaft for the purpose of developing a high torque at the output shaft.

It is also a specific object of this invention to provide a motor-operated gear reduction unit in which means are provided for limiting the maximum output torque.

Further to the preceding object, it is also an object of this invention to provide a device of the character referred to in which means are provided for preventing overspeeding.

Yet another specific object of this invention is to provide a gear reduction drive which is operated by a motor having manually operated means for actuating the unit, independently of the functioning of the motor.

A still further specific object of this invention is to provide a planetary gear reduction drive in which means are provided for automatically equalizing the tooth loading of a plurality of gears engaging a common gear.

The foregoing statements are merely illustrative of the various aims and objects of this invention. Other objects and advantages will become apparent upon a study of the following disclosure when considered in conjunction with the accompanying drawings in which:

Figures 1 and 2 taken together illustrate a longitudinal sectional view partly in side elevation of a power gear reduction drive embodying the principles of this invention;

Figure 1:
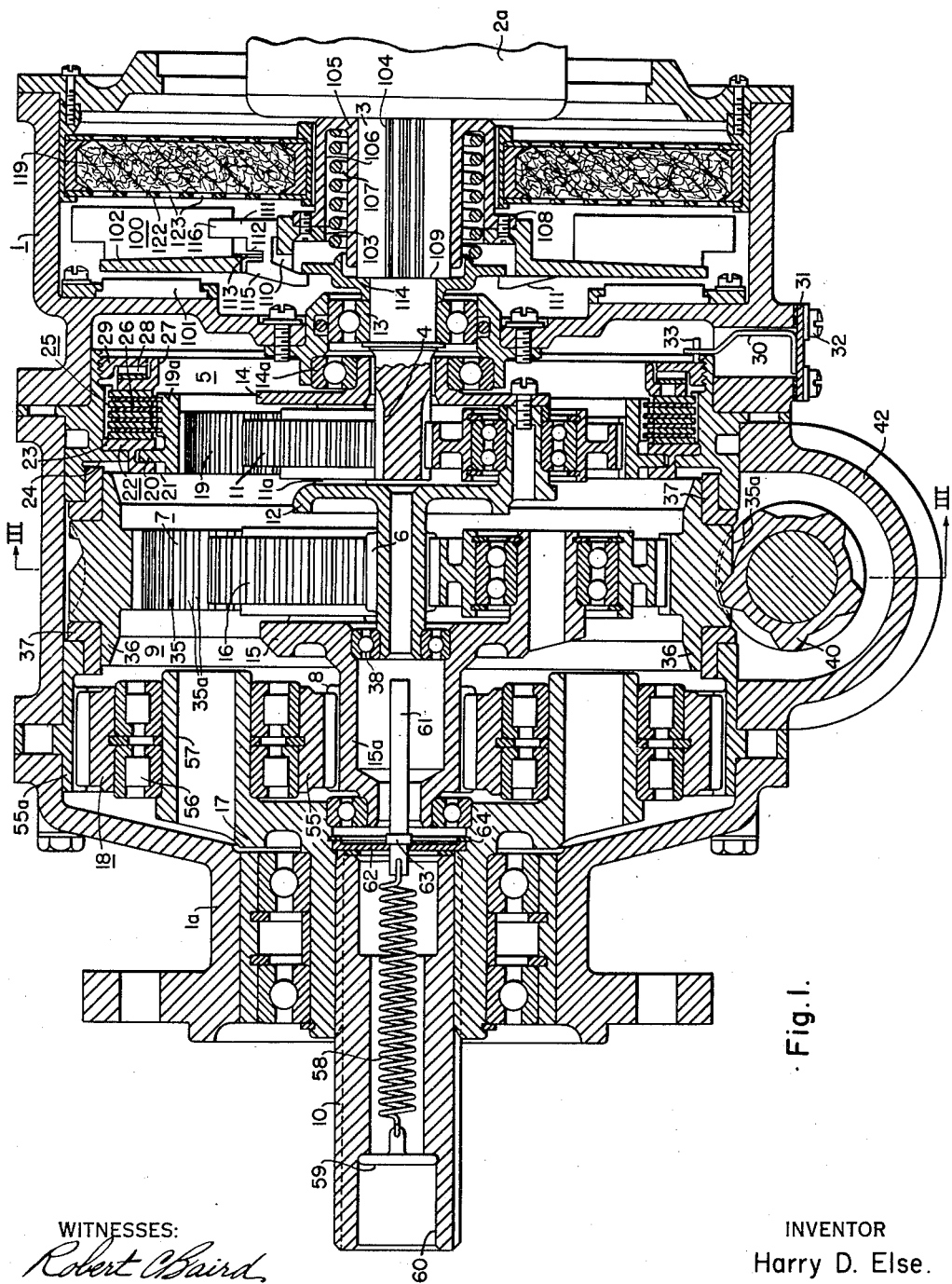

In general, the apparatus of this invention is housed within a main housing generally designated 1. This main housing is comprised of a plurality of sections for facilitating the assembly of the various components of the complete unit. These components include an electric motor 2 having a rotor 2a only partially visible, which motor is located within that portion of the housing not illustrated in section in Figure 2. The motor 2 is provided with a shaft which projects from both its left and right-hand ends as viewed. On its left-hand end this shaft, which is designated 3, is provided with a pinion 4 which forms the driving pinion of the first planetary gear reduction stage generally designated 5. The output of the planetary gear drive 5 drives a pinion 6 which is the input driving pinion for the second planetary gear reduction stage generally designated 7. The output of the second stage 7 drives a pinion 8 which is the input driving pinion for the third planetary gear reduction stage 9, the output of which is represented in a splined output shaft 10.

Considering the various planetary gear reduction stages individually, the driving pinion 4 of the stage 5 engages three planet pinions 11 which are mounted in equally, circumferentially spaced relation on shafts 11a which form a part of a planet carrier 12. The motor shaft 3 at its left-hand end, as viewed in Figure 1, is journalled in a ball bearing assembly 13, the outer race of which is secured in a suitable bearing support which is formed in the housing 1. The planet carrier 12 is journalled at its right-hand end by means of a journal 14 which is supported on the right-hand end of the planet pinion shafts which in turn is carried in a ball bearing race 14a journalled in a support in the housing 1. The left-hand end of the planet carrier 12 as viewed is journalled in a ball bearing assembly concentrically positioned within the planet carrier 15 which journals the planet gears 16 for the planetary gear reduction stage 7. The left-hand end of the planet carrier 15 is journalled in a planet carrier 17 which journals the planet gears 18 of the final gear reduction stage. The planet carrier 17 is journalled in a cylindrical section 1a concentrically formed with respect to the axis of motor shaft 3 in the left-hand end of the housing 1.

Thus, it will be appreciated that each of the planet carrier members is mounted for rotation about an axis which is common with that of the motor shaft 3. Returning now to the gear reduction unit 5, the planet pinions 11 mesh with an internally toothed ring gear 19. Ring gear 19 is equipped with a radially extending flange 20 about its periphery. This flange fits within an annular recess 21 which is formed within the gear supporting member 22 and forms the bearing mount for this ring gear. This recess is of such a diameter that the bottom of the recess clears the outer edge of the flange 20 thus permitting the ring gear 19 to be displaced radially with respect to the axis of the motor shaft 3. The sides of the recess 21 slidably receive the flange 20 to permit sliding movement of the flange therewithin but preventing any appreciable axial movement of the ring gear with respect to the assembly. The gear supporting member 22 is provided with a radially extending flange 23 which fits between an inwardly flanged portion 24 of the main housing and a brake assembly generally designated 25. With the arrangement thus far described, it will be appreciated that upon rotation of the drive shaft 3 the pinion 4 engaging the planet pinions or gears 11 will rotate these gears. Assuming that the brake 25 is applied sufficiently tight that the ring gear 19 may not move, rotation of the planet gears 11 will result in their traveling around the inner surface of the gear 19, and in doing so will drive the planet carrier 12 in rotation.

The brake 25 is of the disc type and comprises a plurality of flat rings or discs 26 which are alternately splined in engagement with the stationary housing portion 24 and a splined section 19a on the outer peripheral surface of the gear 19. With this arrangement, upon the application of pressure axially of the discs 26, it will be appreciated that the frictional restraint afforded to rotational movement of the gear 19 by the friction discs will be sufficient to prevent rotation of the gear 19. The means for accomplishing this pressure application comprises an annular member 27 against the side of which an annular wave-shaped spring 28 is positioned. The wave-shaped spring 28 is deflected in compression by means of a nut 29 which is threadedly received within the housing portion 24 and which moves axially when rotated in a clockwise direction to apply a compression load to the wave-shaped spring 28. The nut 29 is prevented from rotating from a predetermined adjusted position by means of an arm 30 secured in the bottom portion of the housing in a suitable opening provided therein, upon a plate 31, which plate in turn is removably attached to the housing by means of screws 32. The nut 29 is castellated to receive the free extremity of the arm 30 as illustrated at 33.

With the arrangement thus far provided, it will be appreciated that the ring gear 19 is essentially positioned in a floating bearing in which radial movement of the gear is frictionally restricted by means of the frictional restraint afforded between the cooperating faces of the brake discs 26 but which is yet sufficiently movable by forces due to unequal gear tooth pressures acting radially of the ring gear, to afford substantial equalization of tooth pressure.

In the second gear reduction stage designated 8, the driving pinion 6, as previously described, is driven by rotation of the planet carrier 12. This driving pinion 6 may be integrally formed with the planet carrier as shown or may be a separate gear secured by any suitable means to rotate with the planet carrier. The planet pinions 16 of this second gear reduction stage mesh with an internally toothed ring gear 35 which is journalled by means of its circular flanges 36 in bronze bushings 37 which are secured in the housing 1. A degree of flexibility is provided in this planetary gear assembly for equalization of tooth pressures in the manner in which the planet carriers 12 and 15 are journalled. As these units are journalled, it will be appreciated that slight radial movement of the assembly may occur at the bearings 38 which are disposed between the left-hand end of the planet carrier 12 and the right-hand end of the planet carrier 15. With such an arrangement, slight radial movement of the pinion 6 obtains to afford an equal distribution of tooth loading, at this point, between the pinion 6 and the planet pinions 16.

The object in journalling the internally toothed gear 35 of the second reduction gear stage 7 is to provide a means for introducing a manual drive to the gear reduction system. By this means, it is possible to manually actuate the gear unit from this reduction stage through the final gear reduction stage to operate the splined output shaft 10, making it possible to inch the load which is being handled by the power unit. This is a very important provision in aircraft applications since heavy loads must be lowered very gently upon the floor of the plane to avoid damage to the craft. Additionally, inching is sometimes useful in traversing a load in a hoist system affording both hoisting and traversing of the load by power connection with the power unit. As a rule in aircraft applications, inching for hoisting purposes is not contemplated except in case of electric power failure or motor failure.

Figure 3:
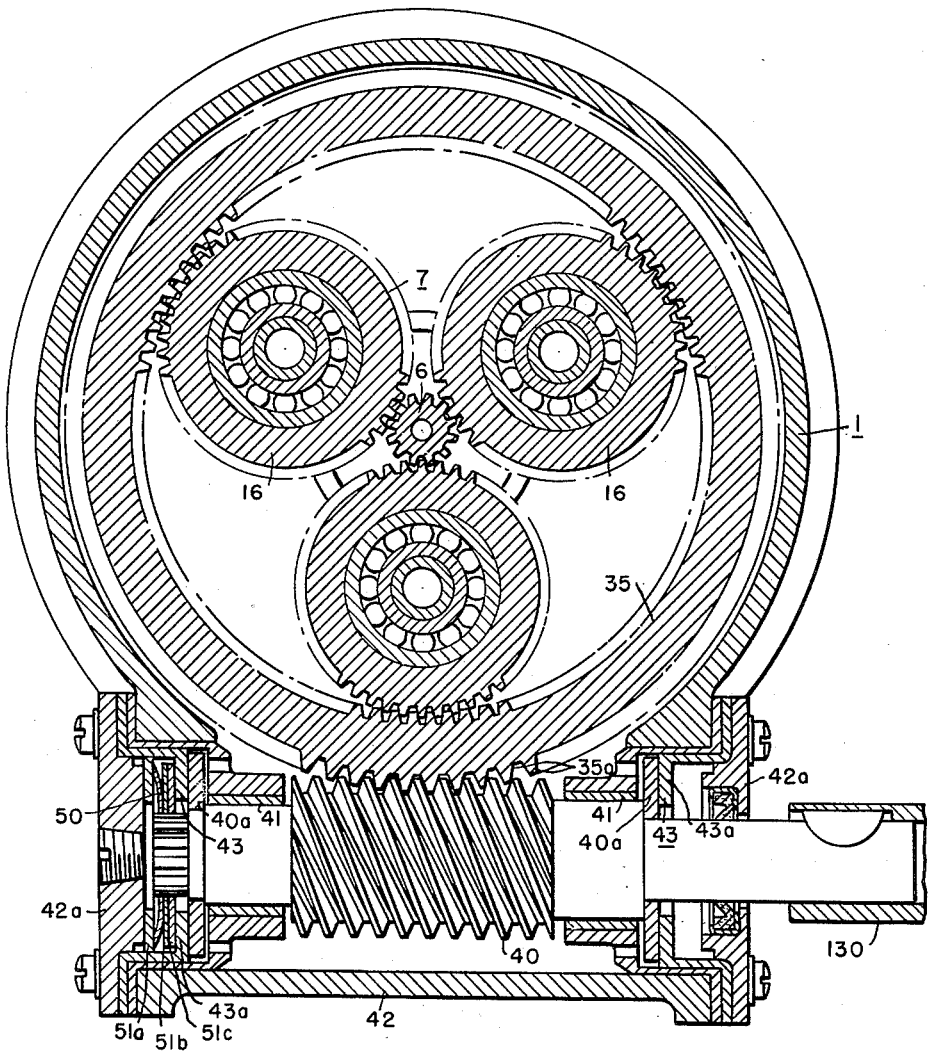
Figure 3 is a sectional view taken on the line III—III of Figure 1.

The specific drive of the ring gear 35 is illustrated in transverse section in Figure 1 and in longitudinal section in Figure 3. This drive includes a worm gear 40 having five separate tooth helices thereon. This worm meshes with correspondingly shaped teeth 35a which are formed in the outer periphery of the internal ring gear 35. The worm is journalled in bronze bearings 41 which are secured in a worm housing 42 formed as an integral addition to the bottom of the main housing 1. It will be noted from the drawings that the worm helix is fairly steep. This steep helix is utilized for the purpose of obtaining a reduction in this drive that is not too large. However, with a helix angle such as illustrated, if the worm shaft were supported on ball bearings, it would overhaul freely. In other words, the efficiency of the worm is considerably higher than fifty per cent. The requirement for not overhauling is that the efficiency must be equal to or less than fifty per cent. To prevent overhauling, friction means are provided so that the friction load is proportional to the thrust load on the worm. The thrust load on the worm in turn is indicative of the magnitude of the load which is being carried by the hoist actuated by this gear reduction unit or, in general, by the torque loading of output shaft 10.

The friction means includes a pair of thrust washers 40a which are secured on opposite sides of the worm to the worm shaft, as viewed in Figure 3. Thrust washers 40a are engaged by thrust bearing members of bronze, designated 43. These thrust bearing members are substantially cup-shaped having a flat face 43a disposed against the confronting faces of the thrust washers 40a and being outwardly flanged at their extremities to be received beneath the faces of the end plates 42a for the worm housing, which end plates are secured to the worm housing by means of screws which clear through the plates and thread into the main housing 1. It will be apparent that the reaction of the worm against one or the other of the thrust plates will produce resistance to rotation which supplements loses in the worm itself, and in combination therewith produces losses which can be adjusted to give an efficiency lower than fifty per cent. The desirable feature in this design is that both the loss in the thrust plate and the loss in the worm and wheel are directly proportional to the amount of the load.

The usual solution to this problem is to provide a high, fixed mechanical resistance or drag, which means that when lowering light loads it requires almost as much torque at the crank arm as when lowering heavy loads. With the illustrated arrangement the torque on the crank arm is substantially proportional to the actual load which is being handled.

In some instances it may be desirable to have a small amount of fixed resistance in the assembly. This is conveniently provided by the provision of a spring washer 50 which is disposed between one of the worm housing end plates and the corresponding thrust bearing 43, and is compressed between a set of washers 51a, 51b, and 51c, washer 51a is disposed against the housing end plate and the other two, 51b and 51c, are splined at 51d to the worm shaft to move axially with respect thereto. Washer 51c engages the flange of the corresponding thrust bearing 43. By selection of the number of shims which are utilized, the deflection of the washer 50 may be adjusted to provide the required amount of pressure on the thrust bearing surface 43a to vary the frictional restraint between the thrust bearing and the washer 51c cooperating therewith. The axial freedom between the washers 51b and 51c permits displacement of the worm shaft to frictionally engage thrust bearing 43 in a degree dependent upon the load being hoisted.

The driving pinion 8, which constitutes the power input to the third gear reduction stage (generally designated 9), meshes with a plurality of planet pinions 55 which are carried in suitable bearings 56 on the shafts 57 of the planet carrier 17. As earlier noted, the planet carrier 17 is journalled in bearings in the concentrically formed left-hand end 1a of the housing 1, as viewed in Figure 1. The shaft of the planet carrier 17 is hollow and is internally splined to receive the splined output shaft 10. The output shaft 10 is secured in splined engagement with the hollow planet carrier shaft by means of a spring 58 which is tensioned between a cross bar 59 which straddles the opening 60 in the output shaft 10 and a venting tube 61 which is inserted through a hole in a circular plate 62 and secured against movement therethrough by a collar 63 formed on the tube 61. The plate 62 is received in a counterbored section at the right-hand end of the hollow shaft of the planet carrier 17 and is locked therein by means of a locking ring 64. Tube 61 projects into the tubular section 15a of planet carrier 15, and provides a means for venting oil fumes from the gear case and at the same time prevents spilling of the oil from the gear case in the event that the unit is positioned on its end, that is, the output shaft end. The oil level in the gear case is such that it will not rise above the right-hand end of the tube as viewed in Figure 1 when the unit is placed upon its output end.

A brake 70 is provided for holding the gear unit in any predetermined position. This brake is of the disc type and includes a hub section 71 which is secured to the right-hand end of the motor shaft. The outer surface of the hub section 71 is splined and has positioned thereon a plurality of discs 72. Discs 73, which are in splined engagement with an internally splined ring 74 secured to the housing 1, are disposed between the discs 72 to be moved into frictional engagement therewith upon the application of axial pressure to the disc assembly. Axial pressure is applied by means of the spring biased armature 75 of an electromagnet generally designated 76. This electromagnet includes a core 77 provided with an annular recess within which is positioned a coil 78 for producing the armature actuating magnetic flux. The armature 75 is carried by means of a shaft 80 which is integrally formed therewith and which extends through a central opening 81 in the core 77 and is journalled therein for sliding movement through the opening 81 by means of the non-magnetic sleeve bearings 82 and 83, which are fitted into suitable recesses formed in the opening 81. The armature shaft 80 at the point where it integrally joins with the main portion of the armature 75 is stepped in sections of increasing diameter 84 and 85, and the opening 81 is correspondingly stepped to receive these enlarged diameter shaft sections.

The purpose of increasing the diameter of the armature shaft at the point adjacent the armature is to avoid a restriction of the flux which usually occurs at the point of attachment of the stem of the armature to the flange. With this arrangement, ample magnetic material is provided to minimize the possibility of saturation at this point. The non-magnetic bearings 82 and 83 suitably position the shaft 80 of the armature to provide substantially constant radial airgap characteristics throughout the range of armature movement. The core 77 is suitably faced at 87 to provide a seating surface for the face plate 88 of the armature. The armature is illustrated in the position in which it is attracted to the core 77.

Spring pressure is utilized to bias the armature in a direction to engage the disc brake assembly and apply axial pressure thereto. This is accomplished by means of a plurality of springs 90 which are disposed between the end plate 91 of the main housing and the armature proper. The springs are secured in position by means of rods 92 which are bolted into the housing end plates 91 and which slidably pass through holes around the outer rim of the armature 75. The rods 92 in addition to properly positioning and securing the springs 90 also prevent the armature from rotating.

Figure 2:
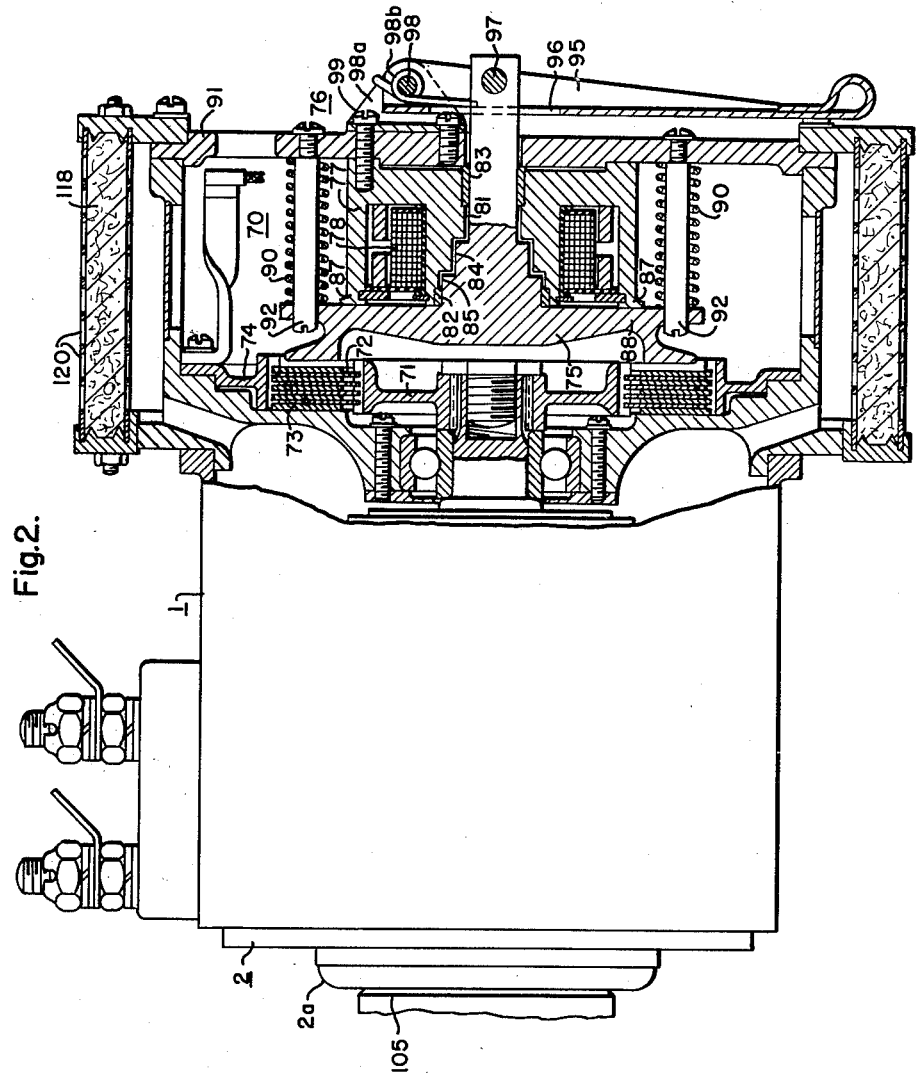
Figure 4:
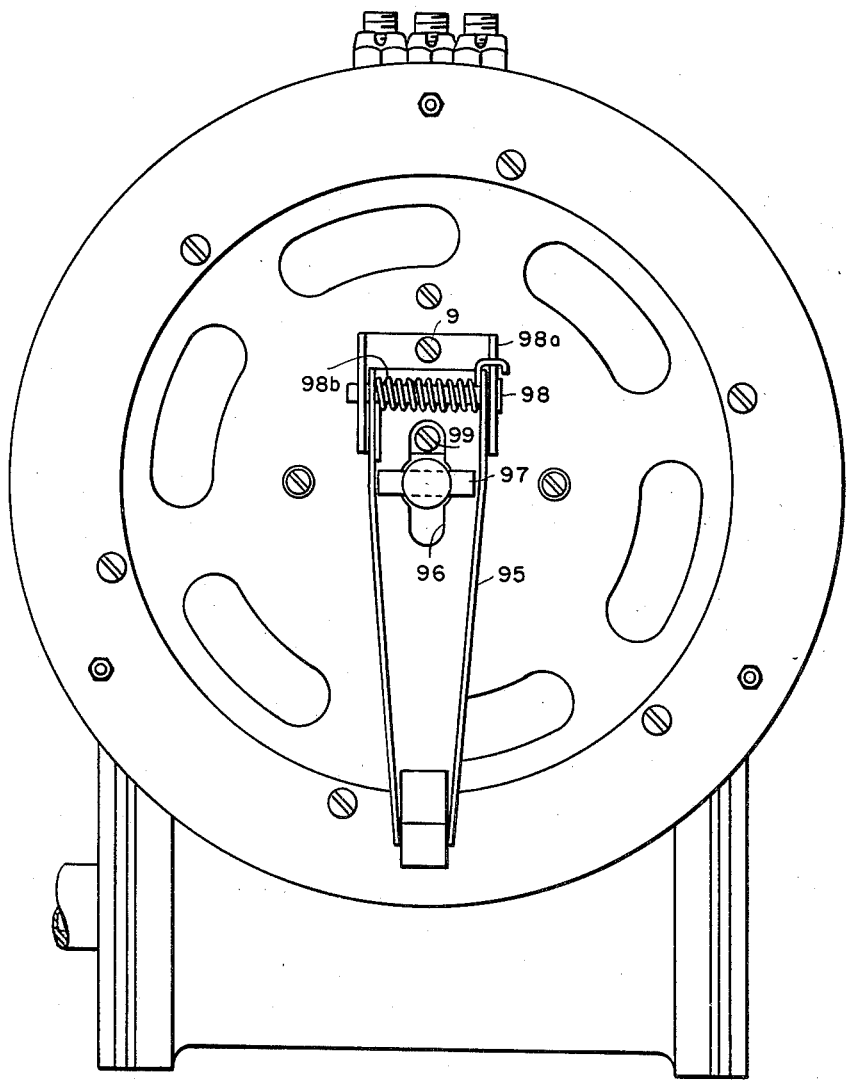
Figure 4 is an end view of the equipment illustrated in Figure 2.

Manual releasing means is also provided for the brake. To this end the armature shaft 80 is extended through the end plate 91 of the main housing. The end of this shaft projects through a lever arm 95 which is formed of stamped sheet metal having a cross section of substantially the shape of a channel. The opening in this lever through which the armature 80 propjects is designated 96, and as better viewed in Figure 4, the opening is disposed longtudinally of the lever. The end of the armature shaft 80 is drilled to receive a pin 97 which lies transversely of the hole 96 completely straddling this opening and seating upon the base or bight of the channel to prevent withdrawal of the armature shaft through the opening. The upper end of the lever 95, as viewed, is pivotally mounted by means of a pin 98 in a bracket 98a. A helically wound torsional biasing spring 98b, disposed about the pin 97, engages the bracket 98a at one extremity and the lever 96 at its other extremity to provide a clockwise biasing torque to the lever as seen in Figure 2. Thus, in order to release the brake manually, the bottom end of the lever 95 is grasped and pulled away from the end plate 91. The pin 97 which is in engagement with the base or bight of the channel exerts a thrust towards the right of the armature shaft as seen in Figure 2 and pulls the armature assembly away from the friction discs to release the brake assembly.

The bracket 98a is fastened to the end plate 91 by means of screws 99. Thus, this entire lever assembly is conveniently removed without disturbing the armature or the armature shaft by the simple expedient of removing the screws 99 and rotating the lever and its bracket through an angle of 90°, to align the slot 96 with the pin 97. The slot being wider than the diameter of the pin and being longer than the length of the pin allows the pin to pass through, permitting complete removal of the armature actuating lever.

Overspeeding of the unit is prevented by means of a speed-responsive brake designated 100. This brake includes a stationary braking surface 101 which is secured to an inwardly projecting portion of the housing 1. The stationary braking surface is comprised of a plurality of carbon brush inserts which serve as the friction braking material for the stationary surface. The movable portion of the brake is of the form of a disc 102 which is axially spaced from the surface of the carbon brushes 101 by a small distance under normal operating conditions. The braking disc 102 is provided with a flanged opening centrally thereof designated 103, which is positioned about a splined section 104 of the motor shaft 3. The splined section 104 slidably receives a sleeve 105 provided with a recess 106 in which is positioned a helical compression spring 107. An outwardly flanged portion 108 of sleeve 105 is screwed to the flange 103 of disc 102 to slidably mount this disc upon the motor shaft 3 to rotate therewith. A flanged collar 114 is mounted between the shoulder 109 at the end of the splined section 104 of the motor shaft and the bearing 13 which carries the motor shaft. Suitable slots 110 are provided in the disc 102 to receive a plurality of weights 111. Each weight 111 is provided with a slot 112. A ring 113, which is secured to the disc 102, passes through the slot in each of the weights, and its inner peripheral edge seats upon the base of the slot under normal conditions.

The arrangement is such that the point of engagement of the ring 113 with each of the weights 111 forms a flexible pivot point for each of the weights. The weights are generally of Z-shape in plan form and have a projecting arm 115 on the left of the ring 113 as viewed. The free extremity of the arm 115 normally engages the collar 114. The weights are designed to have a predominant mass 116 to the right of the pivot thereof; and, consequently, as the assembly is rotated, a torque acting about the pivot of each of the weights in a counterclockwise direction will be produced. Since the collar 114 is secured against axial movement upon the shaft, this counterclockwise rotation of the weights results in a component of force on the disc 102 to the left as viewed. By reason of the connection of the disc with the splined sleeve, this force is applied through the sleeve to the compression spring 107 positioned between the sleeve and the fixed collar 114. As the torque increases, the force opposing the spring also increases and moves the sleeve to the left along the motor shaft 3. If the speed is sufficient, the resulting force compresses the spring to the point that the disc 102 engages the carbon brush surfaces of the stationary friction plate 101, and the friction forces so generated tend to prevent overspeeding of the motor and gear drive.

The danger of fire in the aircraft due to the ignition of combustible gases by motor heat or arcs at the brushes of the motor is eliminated by the flame quenching system which is arranged in the ventilating path for the motor. This flame quenching system comprises a pair of chambers 118 and 119. The chamber 118 is cylindrical in shape and is formed of a pair of concentrically spaced cylinders having a plurality of holes 120 therethrough. The cylindrical cavity formed within the chamber is filled with small thread-like pieces of metal which have high heat conductivity. Chamber 119 is formed by a pair of spaced discs 122 having holes 123 therethrough. The space within these discs is filled with thread-like metal similar to that in the case of the chamber 118. The two flame quenching units are positioned in the path of airflow through the motor housing, the flame quenching unit 118 constituting the input side for the air flow and unit 119 being the output side. Thus, assuming a combustible mixture of air and gas inside of the housing, should ignition take place, the resulting expansion of the burning gas within the housing would tend to force the flame from the housing back through its inlet and through its outlet, which under normal conditions would cause the flame to pass beyond the housing, igniting the gases which accumulated about the unit and causing an explosion. In the instant case, however, due to the flame quenching units, the flame is completely confined to the motor housing for the reason that upon contact of the flame with the flame quenchers, and due to their high heat conductivity, the flame temperature is reduced to a point where combustion can no longer exist. Consequently, the flame is extinguished before it passes through either of the flame quenching units.

In operation in the hoisting of cargo onto the aircraft, the usual practice is to operate the unit in hoisting direction by means of the electric motor 2. After the cargo has been manipulated into a position where it is to be located on board the craft, if the load is not very heavy it may be lowered by reversing the direction of rotation of the motor. However, in the event a very heavy load is involved requiring extremely gentle lowering, the electric control may be shut off and the worm 40 manually actuated by means of the crank fragmentarily shown at 130. When the motor is shut off and the brake 70 applied, the input to the reduction gear drive is prevented from operating and this stage of the drive is accordingly stationarily secured. Upon rotation of the crank in the lowering direction, the ring gear 35 of the second gear reduction stage is rotated. Since the driving pinion 6 of this stage is now stationary, rotation of the internal gear 35 causes the planet pinion assembly to rotate the driving planet carrier 15 and gear 8 connected therewith in rotation. Gear 8 rotates the planet pinions 55, which due to their connection with the internal stationary ring gear 55a, rotate the planet carrier 17, which through its splined connection with output shaft 10 rotates this output shaft in a direction to lower the load.

Throughout the normal operation of the unit, it will be appreciated that the overspeed control will prevent overspeeding of the motor, while at the same time the torque limiting control represented in the clutch 25 and its adjusting mechanism will prevent the handling of loads in excess of the safe capacity of the system. It is advantageous to locate the clutch assembly 25 in the first stage of the gear reduction drive for the reason that the torque developed at this point is considerably less than the torque which is developed in either of the second or the third stages. Thus, correspondingly smaller components may be utilized and additionally the size proportion of the components may be selected such that the desired degree of stability in the clutch system may be achieved without resorting to excessively sized parts and excessive clutch pressures, all of which if excessive complicate the structure and incorporate inherent erratic operation.

While but one embodiment of this invention has been herein illustrated and described, it will be appreciated by those skilled in the art that numerous changes in arrangement of the parts and in details of the parts may be made without departing from the spirit and scope of this invention. Accordingly, it is intended that the foregoing disclosure and the showings made in the drawings shall be considered only as illustrative of the principles of this invention and not interpreted in a limiting sense.

I claim as my invention:

1. In a planetary gear system, the combination of, a driving pinion, a plurality of planet gears, a planet carrier supporting said planet gears circumferentially spaced about said driving pinion in mesh therewith, means mounting said planet carrier for rotation about an axis coaxially disposed of the axis of rotation of said driving pinion, an internally toothed ring gear disposed about said planet gears in mesh therewith, said ring gear having a radially projecting flange around the periphery thereof, a bearing structure having an annular recess for receiving said flange with the sides of said flange in sliding engagement with said bearing structure, said bearing structure permitting radial displacement of said flange and ring gear therein, a housing for the planetary gear system, and friction means frictionally connecting said ring gear with said housing.

2. In a planetary gear system, the combination of, a driving pinion, a plurality of planet gears, a planet carrier supporting said planet gears circumferentially spaced about said driving pinion in mesh therewith, means mounting said planet carrier for rotation about an axis coaxially disposed of the axis of rotation of said driving pinion, an internally toothed ring gear disposed about said planet gears in mesh therewith, said ring gear having a radially projecting flange around the periphery thereof, a bearing structure having an annular recess for receiving said flange with the sides of said flange in sliding engagement with said bearing structure, said bearing structure permitting radial displacement of said flange and ring gear therein, and means for controlling rotational movement of said ring gear.

3. In a planetary gear system, the combination of, a driving pinion, a plurality of planet gears, a planet carrier supporting said planet gears circumferentially spaced about said driving pinion in mesh therewith, means mounting said planet carrier for rotation about an axis coaxially disposed of the axis of rotation of said driving pinion, an internally toothed ring gear disposed about said planet gears in mesh therewith, said ring gear having a radially projecting flange around the periphery thereof, a bearing structure having an annular recess for receiving said flange with the sides of said flange in sliding engagement with said bearing structure, said bearing structure permitting radial displacement of said flange and ring gear therein, said ring gear having splines externally thereof adjacent said flange, a plurality of flat friction rings mounted on said splines, a plurality of stationarily mounted flat friction rings interfitting with said first-mentioned friction rings, and means for applying a force axially of said friction rings to effect a predetermined engaging pressure therebetween.

4. In a planetary gear system, the combination of, a driving pinion, a plurality of planet gears, a planet carrier supporting said planet gears circumferentially spaced about said driving pinion in mesh therewith, means mounting said planet carrier for rotation about an axis coaxially disposed of the axis of rotation of said driving pinion, an internally toothed ring gear disposed about said planet gears in mesh therewith, said ring gear having a radially projecting flange around the periphery thereof, a bearing structure having an annular recess for receiving said flange with the sides of said flange in sliding engagement with said bearing structure, said bearing structure permitting radial displacement of said flange and ring gear therein, said ring gear having splines externally thereof adjacent said flange, a plurality of flat friction rings mounted on said splines, a plurality of stationarily mounted flat friction rings interfitting with said first-mentioned friction rings, a wave-shaped annular ring disposed against an end friction ring, an annular nut having a flange portion engaging said spring for stressing said spring and applying compression forces to said friction rings, and means for releasably securing said nut in predetermined angular positions.

5. In a three-stage planetary gear drive including an input stage, an intermediate stage and an output stage, each stage having an internal ring gear meshing with a plurality of planet pinions on a planet carrier, the planet pinions in turn meshing with a driving gear, the driving gear of the output stage being connected to and driven by the planet carrier of the intermediate stage and the driving gear of the intermediate stage being connected to and driven by the planet carrier of the input stage; the combination of, stationary bearing means engaging the internal ring gear of the input stage about the periphery thereof, frictional restraining means engaging the internal ring gear of the input stage with the stationary bearing means to prevent rotation thereof for torque loading thereof up to a predetermined maximum, stationary bearing means engaging the periphery of the internal ring gear of the intermediate stage, gear teeth on the periphery of the internal ring gear of the intermediate stage, and gear drive means engaging said gear teeth of the internal ring gear of the intermediate stage for controlling rotation thereof.

6. In a three stage planetary gear drive including an input stage, an intermediate stage and an output stage, each stage having an internal ring gear meshing with a plurality of planet pinions on a planet carrier, the planet pinions in turn meshing with a driving gear, the driving gear of the output stage being connected to and driven by the planet carrier of the intermediate stage and the driving gear of the intermediate stage being connected to and driven by the planet carrier of the input stage; the combination of, stationary bearing means engaging the internal ring gear of the input stage about the periphery thereof, frictional restraining means engaging the internal ring gear of the input stage with the stationary bearing means to prevent rotation thereof for torque loading thereof up to a predetermined maximum, stationary bearing means engaging the periphery of the internal ring gear of the intermediate stage, worm-wheel teeth about the periphery of the internal ring gear of the intermediate stage, worm drive means engaging the worm-wheel teeth for controlling rotation of the internal ring gear of the intermediate stage, and friction means for applying a predetermined frictional restraint to rotation of said worm drive means.

7. Apparatus as recited in claim 6 in which said worm gear drive means comprises a worm, a washer secured adjacent each extremity of the worm gear to rotate therewith, a thrust plate disposed in engagement with each washer, spring means engaging one thrust plate, and means for applying a predetermined deflecting bias to said spring means to positively engage the thrust washers and thrust plates under predetermined pressure.

8. In a motor-driven gear reduction drive, the combination of, a motor having a shaft, a first planetary gear reduction unit having a driving pinion connected to one end of said shaft, a plurality of planet gears, a first planet carrier supporting said planet gears in circumferentially spaced meshing relation with said driving pinion, a first internal ring gear rotatably supported about said planet gears in mesh therewith, a second driving pinion connected to said first planet carrier to be driven by rotation of said first planet carrier, a plurality of planet gears, a second planet carrier supporting said last-mentioned planet gears in circumferentially spaced meshing relation about said second driving pinion, a second internal ring gear rotatably supported about said last-mentioned planet gears in mesh therewith, gear drive means connected to said second planet carrier to be driven thereby, friction means engaging said first internal ring gear for restraining rotative movement thereof within a predetermined maximum torque loading of said first integral ring gear speed responsive friction means connected with said shaft for preventing overspeeding of said gear reduction drive, gear teeth about the periphery of said second internal ring gear, and gear means connected with said gear teeth of said second internal ring gear for controlling rotative movement thereof.

9. In a motor-driven gear reduction drive, the combination of, a motor having a shaft, a first planetary gear reduction unit having a driving pinion connected to one end of said shaft, a plurality of planet gears, a first planet carrier supporting said planet gears in circumferentially spaced meshing relation with said driving pinion, a first internal ring gear rotatably supported about said planet gears in mesh therewith, a second driving pinion connected to said first planet carrier to be driven by rotation of said first planet carrier, a plurality of planet gears, a second planet carrier supporting said last-mentioned planet gears in circumferentially spaced meshing relation about said second driving pinion, a second internal ring gear rotatably supported about said last-mentioned planet gears in mesh therewith, gear drive means connected to said second planet carrier to be driven thereby, friction means engaging said first internal ring gear for restraining rotative movement thereof within a predetermined maximum torque loading of said first internal ring gear, speed responsive friction means connected with said shaft for preventing overspeeding of said gear reduction drive, a brake connected with said shaft, gear teeth about the periphery of said second internal ring gear, and gear means meshing with said gear teeth of said second internal ring gear for controlling rotative movements thereof.

10. Apparatus as recited in claim 9 in which said speed responsive friction means comprises a sleeve assembly in splined engagement with said shaft and being slidable along said shaft, an annular friction member having a flat friction surface, means stationarily securing said annular friction member, a second annular friction member having a flat friction surface, means securing said second annular friction member to said sleeve assembly with the friction surface thereof confronting the friction surface of the first-mentioned annular friction member, a collar on said shaft at one end of said sleeve assembly, a helical compression spring about said shaft between said collar and said sleeve assembly biasing said sleeve assembly away from said collar and away from said first-mentioned annular friction member to separate said friction surfaces, and a plurality of speed responsive weights pivotally connected to said sleeve assembly and having one end engaging said collar for biasing said sleeve assembly against said helical spring and moving said friction surfaces together.

11. Apparatus as recited in claim 9 in which said speed responsive friction means comprises a sleeve assembly in splined engagement with said shaft and being slidable along said shaft, an annular friction member having a flat friction surface, means stationarily securing said annular friction member, a second annular friction member having a flat friction surface, means securing said second annular friction member to said sleeve assembly with the friction surface thereof confronting the friction surface of the first-mentioned annular friction member, a collar on said shaft at one end of said sleeve assembly, a helical compression spring about said shaft between said collar and said sleeve assembly biasing said sleeve assembly away from said collar and away from said first-mentioned annular friction member to separate said friction surfaces, a flat ring of resilient material connected to said sleeve assembly in concentric relation therewith, a plurality of weights having slots therein loosely engaging said ring at the inner pheripheral edge thereof to pivot thereon, each of said weights having a projection engaging said collar and being unbalanced with respect to its point of pivoting on said inner peripheral edge of said flat resilient ring to rotate in a direction forcing said projections against said collar and moving said sleeve assembly towards said collar to move said friction surfaces together.

HARRY D. ELSE.

REFERENCES CITED

The following references are of record in the file of this patent:

UNITED STATES PATENTS

| Number | Name | Date |
|---|---|---|
| 1,699,653 | Bronander | Jan. 22, 1929 |
| 1,925,943 | Stein | Sept. 5, 1933 |
| 2,034,145 | Linde | Mar. 17, 1936 |
| 2,085,032 | Licht | June 29, 1937 |
| 2,151,338 | Shonnard | Mar. 21, 1939 |
| 2,400,789 | Thornburg | May 21, 1946 |
| 2,405,338 | Werner | Aug. 6, 1946 |
| 2,406,156 | Nardone | Aug. 20, 1946 |
| 2,419,253 | Cahill | Apr. 22, 1947 |
| 2,420,552 | Morrill | May 13, 1947 |
| 2,420,553 | Morrill | May 13, 1947 |
| 2,437,646 | Matulaitus | Mar. 9, 1948 |
| 2,451,109 | Nardone | Oct. 12, 1948 |
| 2,460,629 | Fawick | Feb. 1, 1949 |